July 31, 1934.  A. A. EWALD  1,968,075

DETACHABLE HOSE COUPLING

Filed Feb. 15, 1932

Inventor
Arno A. Ewald
By Wheeler, Wheeler & Wheeler
Attorneys

Patented July 31, 1934

1,968,075

UNITED STATES PATENT OFFICE 1,968,075

DETACHABLE HOSE COUPLING

Arno A. Ewald, Oakfield, Wis., assignor to Romort Manufacturing Company, Oakfield, Wis., a corporation of Wisconsin Application February 15, 1932, Serial No. 592,869

8 Claims. (Cl. 284—19)

My invention relates to improvements in quick detachable hose couplings.

The primary object of my invention is to provide a hose coupling peculiarly adapted to the requirements for air filling stations and other places where lengths of hose are to be quickly coupled and drawn along the ground in such a manner that ordinary couplings are apt to become uncoupled, damaged or otherwise prevented from forming an air tight connection.

A further object of my invention is to provide an efficient quick detachable hose coupling which will have maximum efficiency although made at minimum cost.

In the drawing.

Like parts are identified by the same reference characters throughout the several views.

Figure 1:
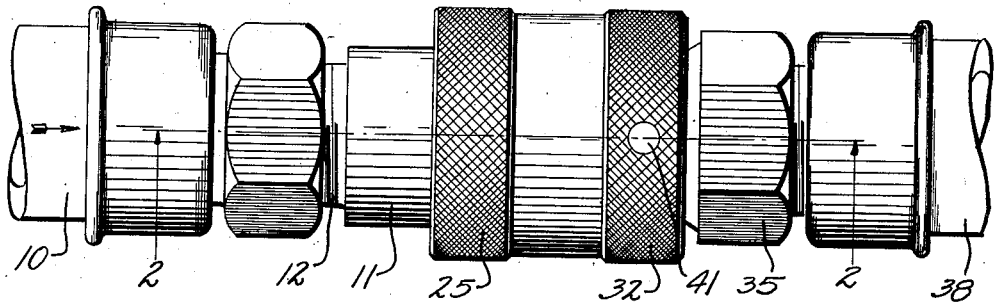
Figure 1 is a view of my improved hose coupling as it appears in use.

A hose or pipe 10, connected with the source of supply, is provided with an end sleeve 11 having a threaded tapered portion 12 to be screwed into the hose.

This end sleeve 11 is provided with an axial port 13, enlarged at its outer end to form a socket 14 in which a valve member 15 is seated, a spring 16 being interposed between the valve member and the base 17 of the socket.

The valve member has an annular seating portion 20 concentric with an outwardly projecting and preferably cylindrical stem 21 provided with an open ended transverse slot 22. Its extremity is reduced to form a shoulder 24 against which pressure may be applied as hereinafter explained to unseat the valve.

A clamping collar 25 is threaded to the delivery end of the member 11 and has an inwardly offset portion 26 adapted to clampingly engage the peripheral portion of a seating collar 27 between it and the delivery end of the member 11. This delivery end of the member 11 and the opposing face of the portion 26 of the clamping collar are provided with annular ribs 29 engaged in grooves in the valve seat collar 27, the latter being preferably formed of rubber and extending inwardly toward the axis of the coupling across the path of the annular valve seat 20.

A coupling sleeve 32 has screw threaded connection with the portion 26 of the clamping collar, and is provided with an internal, steeply pitched coupling thread 33 which receives a corresponding thread 34 carried by a counterpart axially ported coupling head 35, the latter being provided with an axially extending stud 36 which bears against the shoulder 24 on the valve stem 21 to unseat the valve during rotation of the coupling head 35 after engagement of its screw 34 with the internal thread 33 of the sleeve 32. The pitch of the threads 33 and 34 will preferably be such that a partial rotation of coupling head 35 relatively to the sleeve 32 after the threads are engaged, will not only complete the coupling but will also unseat the valve 20 and bring the annular margin of the stud 36 into pressure contact with the valve seat 27.

Fluid may then be delivered through the port 13 into the valve cavity 14 and allowed to pass the valve through the central aperture in the seating member 27, whereupon it reaches the port 37 through the cross slot 22 in the valve stem. The port 37 is enlarged and internally threaded for connection with a delivery pipe 38.

Figure 2:
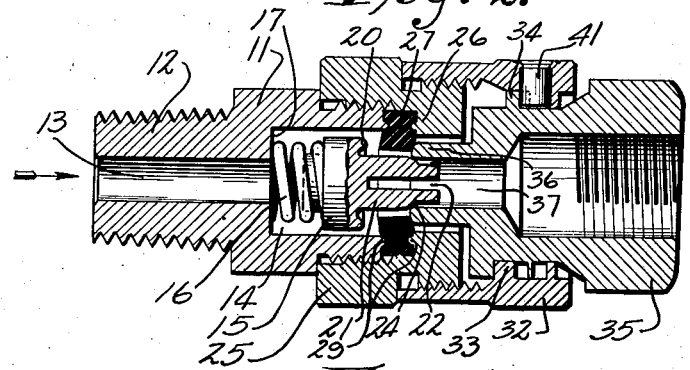
Figure 2 is a sectional view drawn on line 2—2 of Fig. 1.
Figure 3:
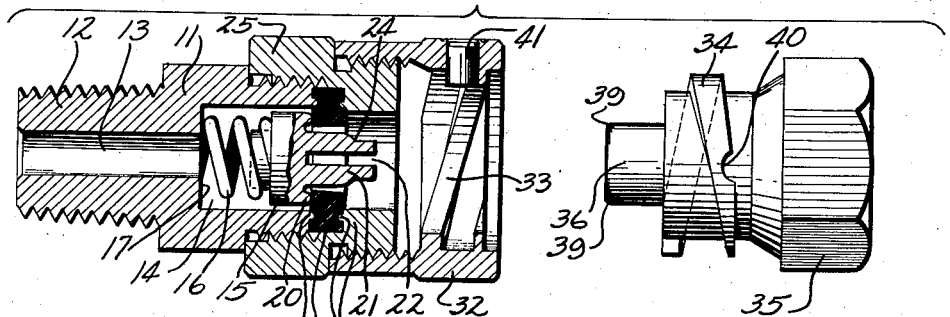
Figure 3 is a similar sectional view showing the coupling members detached.
Figure 4:
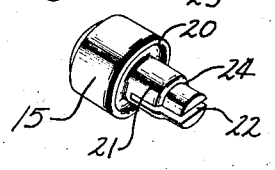
Figure 4 is an isometric view of the spring actuating valve in the receiving member of the coupling.

The rounded end 39 of the stud 36 will bear against the valve seat 27 on the delivery side and will form an air tight joint, preferably after flexing the valve seat 27 in the direction of the retracted valve as clearly indicated in Fig. 2.

To prevent accidental backward rotation of the coupling head 35, and also to indicate to the operator when the coupling has been fully completed, the thread 34 is provided with a notch 40 adapted to register with an inwardly projecting locking pin 41 carried by the sleeve 32, the latter having a transverse bore into which the pin may be forced until its inner end is substantially flush with the side face of the inner margin of the screw thread 33. The pin receiving bore extends through a portion of the thread at the side toward the threaded end of the sleeve, with a cylindrically rounded portion of the pin exposed in a position to be received in the notch or recess 40 when in registry therewith.

The space between successive turns of the thread 33 is wider than the thread 34, sufficient clearance being allowed to permit the thread 34 to ride over the surface of the lock pin 41 until registry of the pin with the notch 40 is attained.

It will be observed in Fig. 1 that the exposed end surface of the collar 25 and sleeve 32 are knurled to facilitate connection of the coupling members as above described. The portions of greatest diameter are circular in form and no exterior latches or other locking devices are required. When the coupling members are separated the valve 20 closes automatically before the coupling head 35 can be withdrawn, thus excluding foreign matter from the valve seat.

When the coupling is again made, the partial rotation of the coupling head 35 ensures a clearing of the delivery side of the valve seat member 27 from any foreign matter which might otherwise prevent an air tight connection, and the flexion of the valve seat 27 will also tend to ensure an air tight joint which will be maintained by the engagement of the locking pin 41 in the socket 40. All of the parts can be readily cleaned by unscrewing sleeve 32 and collar 25 thereby releasing the valve seat 27 and valve member 15.

It will be observed that the shoulder 24 on the valve stem is located intermediately of the ends of the slot 22, whereby the fluid on the outlet side of the valve will not be prevented from freely entering the slot by the engagement of the stud 36 with said shoulder, nor by entry of the reduced end of the valve stem into port 37. During withdrawal of the stud 36 the valve will be guided and its movement regulated until it engages its seat 27.

I claim:

1. A pipe coupling comprising one coupling member having end sleeves threaded to an intermediate clamping collar, and an annular valve seat member peripherally clamped between the collar and one of the end sleeves, in combination with a resiliently mounted valve in said end sleeve and a coupling head adapted to be screwed into the other end sleeve and provided with a tubular projection adapted to unseat the valve while moving rotatively into air tight relation with the inwardly extending portion of the valve seat.

2. The combination with a pipe coupling member having an axially projecting tubular stud and an associated lead screw, in combination with a coupling member having a counterpart lead screw and an internal annular flexible valve seat having an axially yieldable portion in the path of said stud against which said stud is adapted to bear under pressure exerted by the inwardly moving lead screw, said last mentioned coupling member having a spring actuated valve at the opposite side of said seat provided with a projection having a portion against which said stud may also bear to unseat the valve and means for increasing the resistance of the lead screws to relative rotary motion when the stud is in air tight relation to the valve seat.

3. The combination with a pipe coupling member having an axially projecting tubular stud and an associated lead screw, in combination with a coupling member having a counterpart lead screw and an internal annular flexible valve seat against which said stud is adapted to bear, said last mentioned coupling member having a spring actuated valve at the opposite side of said seat provided with a projection having a portion against which said stud may also bear to unseat the valve, one of the lead screws having a recess, and the other having a locking pin associated with its lead screw and adapted to enter the recess when in registry therewith.

4. In a pipe coupling, the combination of two coupling members each provided with mutually engaging steeply pitched lead screw threads, one of the threads having a recess in one side thereof and the other thread having a projection adapted to register with such recess when the members are in full coupling position, a yielding valve seat in one coupling member, a tubular stud in the other coupling member adapted to engage said valve seat in full coupling position, and a valve in one member adapted to be opened by the other member in its final movement toward full coupling position.

5. In a valved pipe coupling assembly including a sleeve provided with a spring actuated valve, an annular seat for said valve having a peripheral portion bearing on one side against the end of the sleeve, a clamping collar having threaded engagement with the sleeve and an inset portion in clamping engagement with the seat, and a coupling sleeve rotatable upon the clamping collar, said coupling sleeve having an internal lead screw for engagement with the counterpart coupling member and an interiorly projecting locking stud adapted for seating engagement with a recess in the counterpart coupling member to prevent their relative rotation from full coupling position.

6. In a valved pipe coupling assembly, a coupling thread having a concave recess in one side face thereof, and a thread engaging member having a second coupling thread complementary to said first mentioned coupling thread and provided with a corresponding projection adapted to be received in said notch in position of full coupling adjustment, one of said members being provided with means for resiliently pressing the coupling threads into engagement with each other when the projection enters said notch.

7. The combination with a coupling member provided with an internal annular valve seat having a resilient portion adapted to be compressed and also flexibly displaced to a limited extent under pressure, of a spring actuated valve adapted for engagement with one side of the seat and provided with a stem extending through the central opening in the seat, a co-operative coupling member having a tubular stud adapted for simultaneous engagement with the valve stem and the seat to yieldingly displace both, said coupling members having mutually engaging lead screws including a projecting shoulder on one screw and a recess in the other screw adapted to receive said shoulder when said members are in full coupling position, said valve seat being adapted by its resilience to maintain contact with the tubular stud during its axial movement corresponding with the seating of the projection in the lead screw recess.

8. In a valved pipe coupling assembly, the combination with a coupling member provided with a flexibly yieldable annular valve seat, of a valve seating on one face of said seat and provided with a stem portion projecting therethrough, and a second coupling member provided with a threaded connection to the first coupling member and including a coupling stud of sufficient radial thickness to engage both said valve stem and said seat, said seat being adapted to yield in the coupling of said members sufficiently to assure a tight coupling between said stud and said seat and to permit the thrust of said stud to open said valve to establish communication between said members, together with means supplementing the threaded connection between said members for impositively effecting an engagement directly between said members upon the completion of a fluid tight coupling between said stud and seat.

ARNO A. EWALD.